United States Patent
Shveidel et al.

(10) Patent No.: US 11,726,663 B2
(45) Date of Patent: Aug. 15, 2023

(54) DEPENDENCY RESOLUTION FOR LAZY SNAPSHOTS IN STORAGE CLUSTER WITH DELTA LOG BASED ARCHITECTURE

(71) Applicant: EMC IP Holding Company LLC, Hopkinton, MA (US)

(72) Inventors: Vladimir Shveidel, Pardes-Hana (IL); Bar David, Rishon Lezion (IL); Michael Litvak, Shoham (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 250 days.

(21) Appl. No.: 17/147,740

(22) Filed: Jan. 13, 2021

(65) Prior Publication Data
US 2022/0221992 A1    Jul. 14, 2022

(51) Int. Cl.
*G06F 12/08* (2016.01)
*G06F 12/0808* (2016.01)
*G06F 12/0815* (2016.01)
*G06F 3/06* (2006.01)

(52) U.S. Cl.
CPC ............ *G06F 3/0619* (2013.01); *G06F 3/067* (2013.01); *G06F 3/0653* (2013.01); *G06F 3/0659* (2013.01)

(58) Field of Classification Search
CPC .... G06F 3/0619; G06F 3/0653; G06F 3/0659; G06F 3/067
USPC ........................................................ 711/162
See application file for complete search history.

(56) References Cited

U.S. PATENT DOCUMENTS

| | | | |
|---|---|---|---|
| 1,090,900 A * | 3/1914 | Barrett | F16B 13/066 411/68 |
| 9,881,014 B1 * | 1/2018 | Bono | G06F 3/065 |
| 10,235,066 B1 * | 3/2019 | Chen | G06F 3/0619 |
| 10,970,210 B2 | 4/2021 | Benhanokh et al. | |
| 11,003,554 B2 | 5/2021 | Shveidel et al. | |
| 11,042,296 B1 | 6/2021 | Shveidel et al. | |
| 11,157,177 B2 * | 10/2021 | Gazit | G06F 3/067 |
| 2004/0078533 A1 * | 4/2004 | Lee | G06F 11/1456 714/E11.12 |
| 2004/0158566 A1 * | 8/2004 | Chong, Jr. | G06F 11/1466 |
| 2017/0220777 A1 * | 8/2017 | Wang | G06F 21/6218 |
| 2017/0315878 A1 * | 11/2017 | Purohit | G06F 16/24573 |
| 2019/0294715 A1 * | 9/2019 | Gupta | G06F 16/17 |
| 2020/0026653 A1 * | 1/2020 | Shveidel | G06F 12/0868 |
| 2020/0349110 A1 * | 11/2020 | Shveidel | G06F 16/128 |
| 2021/0216531 A1 * | 7/2021 | Shveidel | G06F 16/2365 |
| 2022/0221992 A1 * | 7/2022 | Shveidel | G06F 3/0653 |

\* cited by examiner

*Primary Examiner* — Mohamed M Gebril
(74) *Attorney, Agent, or Firm* — BainwoodHuang (57) ABSTRACT

Techniques for providing dependency resolution for lazy snapshots in a storage cluster with a delta log-based architecture. The techniques include creating a dependency relationship between a parent metadata page and a child metadata page, receiving one or more new delta updates of the parent metadata page, and writing, to a metadata delta log, the new delta updates of the parent metadata page as specialized delta update entries that preserve or maintain the new delta update values and their corresponding original (old) delta update values. By preserving or maintaining both the new delta update values and the corresponding old delta update values of the parent metadata page in the metadata delta log, constraints pertaining to the order of de-staging the delta updates of the parent and child metadata pages can be reduced.

17 Claims, 5 Drawing Sheets

DEPENDENCY RESOLUTION FOR LAZY SNAPSHOTS IN STORAGE CLUSTER WITH DELTA LOG BASED ARCHITECTURE

BACKGROUND

Clustered storage systems (also referred to herein as "storage clusters") employ various techniques and/or methodologies to protect and/or distribute electronic data and/or metadata. In response to receipt of at least one write input/output (IO) request for a storage object (e.g., volume, logical unit (LU), file system) from a host computer, a data storage processor (also referred to herein as a "storage node") of a storage cluster writes pending changes (also referred to herein as "delta updates") associated with a metadata page to a metadata delta log in volatile memory before storing the delta updates to a storage array. Having written the delta updates to the metadata delta log, the storage node sends an acknowledgement message to the host computer that issued the write IO request. The storage node subsequently de-stages the delta updates from the metadata delta log and stores them to the storage array.

SUMMARY

A storage node of a storage cluster can be configured with a delta log-based architecture that includes a metadata delta log having a first set of data containers and a second set of data containers, in which each data container of the first and second sets can be associated with a metadata page. The storage node can write delta updates of one or more metadata pages to the metadata delta log, filling one or more of the first set of data containers with the delta updates. The first set of data containers receiving the delta updates can be designated as the "active" set of data containers, while the second set of data containers can be designated as the "de-staging" set of data containers. The storage node can also write copies of the delta updates to a journal in persistent memory. Once one or more of the active set of data containers have been filled, the "active" and "de-staging" designations of the first and second sets of data containers can be switched, and further delta updates of metadata pages can be written to the data containers in the set now designated as "active." In addition, the delta updates that were written to the data containers in the set now designated as "de-staging" can be de-staged from the metadata delta log and stored to a storage array.

In certain embodiments, a snapshot of a metadata page can be created by a process that includes writing specialized delta update entries to the metadata delta log. For example, such specialized delta update entries can have formats expressed as:

"LI2:IS_CHILD_OF:LI1" and

"LI1:IS_PARENT_OF:LI2,"

in which "LI1" and "LI2" correspond to logical indexes of a parent (snap) metadata page and a child metadata page, respectively, resulting from the snapshot creation. Once the specialized delta update entries have been atomically and transactionally written to the metadata delta log, the logical indexes LI1, LI2 of the parent and child metadata pages are allocated. However, the parent and/or child metadata pages are actually built at later times when the delta updates of the respective metadata pages are de-staged from the metadata delta log and stored to the storage array. Such a snap created by this process is referred to herein as a "lazy snapshot." In this snapshot process, the de-staging of the delta updates can include obtaining a base page for building the child metadata page, LI2, by applying, to the base page, the delta updates of the parent (snap) metadata page that occur in the metadata delta log before and up to the entry with the format, LI1:IS_PARENT_OF:LI2. The resulting base page corresponds to a version of the parent (snap) metadata page, LI1, that existed before the creation of a dependency relationship between the parent and child metadata pages, LI1, LI2. The child metadata page, LI2, can then be obtained by applying, to the base page, any delta updates of the child metadata page that occur in the metadata delta log after the entry with the format, LI2:IS_CHILD_OF:LI1.

The foregoing process for creating a lazy snapshot of a metadata page can be particularly useful when a dependency relationship is created between a child metadata page, LI2, and a "read-only" parent metadata page, LI1, such as in a storage backup scenario. However, this technique can be problematic when the child metadata page, LI2, has a dependency relationship with a "writable" parent metadata page, LI1, such as may be the case in a snapshot replication scenario between storage clusters. In this case, the de-staging order of the delta updates imposes a constraint that can prohibit the parent metadata page, LI1, from being de-staged before the child metadata page, LI2. For example, if the parent metadata page, LI1, were de-staged before the child metadata page, LI2, then the base page for building the child metadata page, LI2, may be difficult to obtain due to the de-staged parent metadata page, LI1, possibly containing new delta updates that occur in the metadata delta log after the entry with the format, LI1:IS_PARENT_OF:LI2. Indeed, once the writable parent metadata page, LI1, has been de-staged, one or more original (old) delta updates of the parent metadata page, LI1, may be irretrievably lost. Moreover, because parent-child dependency relationships between metadata pages can be recursive (i.e., corresponding inheritance chains can be long), the resulting algorithmic complexity and/or processing overhead may be high, making the de-staging of the metadata pages very inefficient.

Improved techniques are disclosed herein for providing dependency resolution for lazy snapshots in a storage cluster with a delta log-based architecture. The disclosed techniques can be used to enhance the above-described process for creating lazy snapshots. The disclosed techniques can include writing, to a metadata delta log, one or more specialized delta update entries in addition to the specialized delta update entries described herein with the formats, "LI2:IS_CHILD_OF:LI1" and "LI1:IS_PARENT_OF:LI2," in which "LI1" and "LI2" correspond to logical indexes of a parent metadata page and a child metadata page, respectively, resulting from the snapshot creation. In certain embodiments, each additional specialized delta update entry can have a format expressed as:

"LI1:EI1:NON-INHERITED: OLD_VALUE-NEW_VALUE,"

in which "LI1" corresponds to the logical index of the parent metadata page, "EI1" corresponds to an offset within the parent metadata page, "NEW_VALUE" corresponds to the value of a new delta update of the parent metadata page, and "OLD_VALUE" corresponds to the value of a corresponding original (old) delta update of the parent metadata page. It is noted that the format of the additional specialized delta update entry includes the designation, "NON-INHERITED," to expressly indicate that such delta update entries are not inheritable by the child metadata page, LI2, from the parent metadata page, LI1. Once a dependency relationship is created between the parent metadata page, LI1, and the child metadata page, LI2, subsequent delta updates of the parent metadata page, LI1, can be written to the metadata delta log using the format, LI1:EI1:NON-INHERITED: OLD_VALUE-NEW_VALUE. By creating a dependency relationship between a parent metadata page and a child metadata page, receiving one or more new delta updates of the parent metadata page, and writing, to a metadata delta log, the new delta updates of the parent metadata page as specialized delta update entries that preserve or maintain both the new delta update values and their corresponding original (old) delta update values, constraints pertaining to the order of de-staging the delta updates of the parent and child metadata pages can be reduced.

In certain embodiments, a method of providing dependency resolution for a parent page and a child page in a storage cluster with a delta log-based architecture includes writing one or more new data values of a parent page to a data log. The new data values of the parent page have corresponding original data values. The new data values of the parent page are written to the data log as respective specialized data entries that maintain both the new data values and the corresponding original data values. A dependency relationship exists between the parent page and a child page. The method further incudes, in a first de-staging operation for de-staging the parent page to data storage, building the parent page including the new data values maintained by the respective specialized data entries of the data log. The method further includes, in a second de-staging operation for de-staging the child page to the data storage, building a base page including the original data values of the de-staged parent page maintained by the respective specialized data entries of the data log, and building the child page by applying one or more new data values of the child page to the base page.

In certain arrangements, the method further includes, at a time of creation of the dependency relationship between the parent page and the child page, writing, to the data log, a first specialized data entry that indicates the child page as being a child of the parent page.

In certain arrangements, the method further includes writing one or more new data values of the child page to the data log after the first specialized data entry.

In certain arrangements, the method further includes, at the time of creation of the dependency relationship between the parent page and the child page, writing, to the data log, a second specialized data entry that indicates the parent page as being a parent of the child page. The one or more new data values of the parent page are written to the data log after the second specialized data entry.

In certain arrangements, the first de-staging operation includes locating the second specialized data entry in the data log, and applying, to the parent page, data values of the parent page that occur in the data log before and up to the second specialized data entry.

In certain arrangements, the first de-staging operation further includes applying, to the parent page, the new data values of the parent page from the respective specialized data entries that occur in the data log after the second specialized data entry.

In certain arrangements, the first de-staging operation further includes storing the parent page to data storage.

In certain arrangements, the second de-staging operation includes determining whether or not the parent page has already been de-staged.

In certain arrangements, the second de-staging operation further includes, having determined that the parent page has not yet been de-staged, obtaining a base page for the child page including locating the first specialized data entry in the data log, obtaining a logical index of the parent page from the first specialized data entry, and applying, to the base page, the data values of the parent page that occur in the data log before and up to the second specialized data entry.

In certain arrangements, the second de-staging operation further includes, having obtained the base page, building the child page including applying, to the base page, one or more new data values of the child page written to the data log after the first specialized data entry.

In certain arrangements, the second de-staging operation further includes, having determined that the parent page has already been de-staged, obtaining a base page for the child page including locating the first specialized data entry in the data log, obtaining a logical index of the parent page from the first specialized data entry, and loading a copy of the parent page from data storage.

In certain arrangements, the second de-staging operation further includes applying, to the loaded copy of the parent page, the corresponding original data values of the parent page from the respective specialized data entries that occur in the data log after the second specialized data entry.

In certain arrangements, the second de-staging operation further includes, having obtained the base page, building the child page including applying, to the base page, one or more new data values of the child page written to the data log after the first specialized data entry.

In certain arrangements, the second de-staging operation further includes storing the child page to data storage.

In certain arrangements, the method further includes determining that the one or more corresponding original data values are unknown, and maintaining placeholder values for the one or more unknown original data values in the respective specialized data entries.

In certain arrangements, the first de-staging operation includes loading a copy of the parent page from data storage, and replacing the placeholder values for the one or more unknown original data values in the respective specialized data entries with corresponding original data values from the loaded copy of the parent page.

In certain embodiment, a system for providing dependency resolution for a parent page and a child page in a storage cluster with a delta log-based architecture includes a memory, and processing circuitry configured to execute program instructions out of the memory to write one or more new data values of a parent page to a data log. The new data values of the parent page have corresponding original data values. The new data values of the parent page are written to the data log as respective specialized data entries that maintain both the new data values and the corresponding original data values. A dependency relationship exists between the parent page and a child page. The processing circuitry is further configured to execute the program instructions out of the memory, in a first de-staging operation for de-staging the parent page to data storage, to build the parent page including the new data values maintained by the respective specialized data entries of the data log. The processing circuitry is further configured to execute the program instructions out of the memory, in a second de-staging operation for de-staging the child page to the data storage, to build a base page including the original data values of the de-staged parent page maintained by the respective specialized data entries of the data log, and build the child page by applying one or more new data values of the child page to the base page.

In certain embodiments, a computer program product includes a set of non-transitory, computer-readable media having instructions that, when executed by processing circuitry, cause the processing circuitry to perform a method of providing dependency resolution for a parent page and a child page in a storage cluster with a delta log-based architecture. The method includes writing one or more new data values of a parent page to a data log. The new data values of the parent page have corresponding original data values. The new data values of the parent page are written to the data log as respective specialized data entries that maintain both the new data values and the corresponding original data values. A dependency relationship exists between the parent page and a child page. The method further includes, in a first de-staging operation for de-staging the parent page to data storage, building the parent page including the new data values maintained by the respective specialized data entries of the data log. The method further includes, in a second de-staging operation for de-staging the child page to the data storage, building a base page including the original data values of the de-staged parent page maintained by the respective specialized data entries of the data log, and building the child page by applying one or more new data values of the child page to the base page.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Improved techniques are disclosed herein for providing dependency resolution for lazy snapshots in a storage cluster with a delta log-based architecture. The disclosed techniques can include creating a dependency relationship between a parent metadata page and a child metadata page, receiving one or more new delta updates of the parent metadata page, and writing, to a metadata delta log, the new delta updates of the parent metadata page as specialized delta update entries that preserve or maintain the new delta update values and their corresponding original (old) delta update values. By preserving or maintaining both the new delta update values and the corresponding old delta update values of the parent metadata page in the metadata delta log, constraints pertaining to the order of de-staging the delta updates of the parent and child metadata pages can be reduced.

Figure 1:
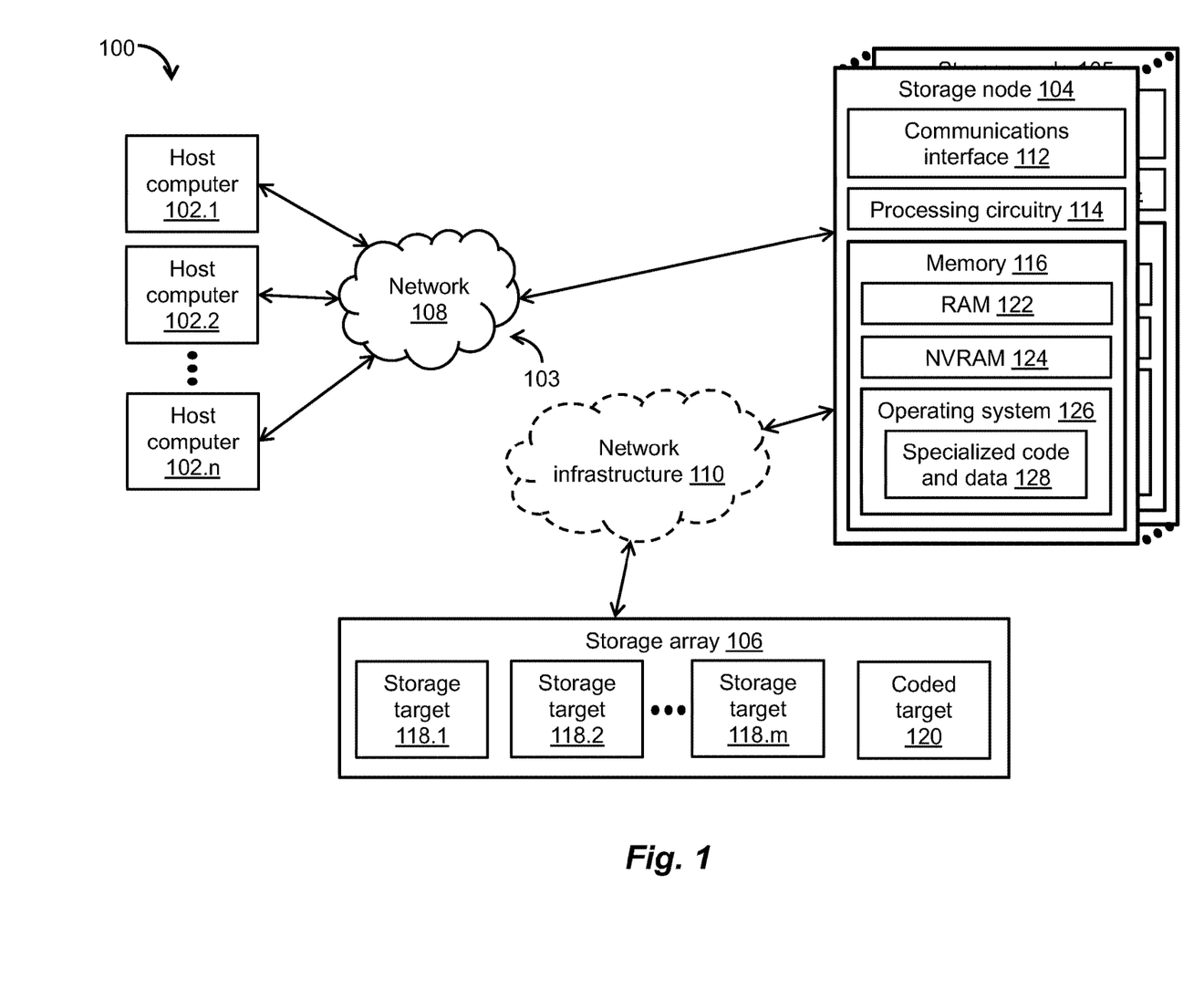
FIG. 1 is a block diagram of a storage cluster environment, in which techniques can be practiced for providing dependency resolution for lazy snapshots in a storage cluster with a delta log-based architecture.

FIG. 1 depicts an illustrative embodiment of a storage cluster environment 100, in which techniques can be practiced for providing dependency resolution for lazy snapshots in a storage cluster with a delta log-based architecture. As shown in FIG. 1, the storage cluster environment 100 can include a plurality of host computers 102.1, 102.2, . . . , 102.n, at least one data storage processor 104 (also referred to herein as a "storage node"), a storage array 106, and a communications medium 103 that includes at least one network 108. For example, each of the plurality of host computers 102.1, . . . , 102.n can be configured as a web server computer, a file server computer, an email server computer, an enterprise server computer, and/or any other suitable client/server computer or computerized device. The plurality of host computers 102.1, . . . , 102.n can be configured to provide, over the network 108, storage input/output (IO) requests (e.g., small computer system interface (SCSI) commands, network file system (NFS) commands) to the storage node 104. Such storage IO requests (e.g., write IO requests, read IO requests) can direct the storage node 104 to write and/or read data blocks, data pages, data files, or any other suitable data elements to/from volumes (VOLs), logical units (LUs), file systems, and/or any other suitable storage targets, such as storage targets 118.1, 118.2, . . . , 118.m maintained in the storage array 106.

The communications medium 103 can be configured to interconnect the plurality of host computers 102.1, . . . , 102.n with the storage node 104 to enable them to communicate and exchange data and/or control signaling. As shown in FIG. 1, the communications medium 103 can be illustrated as a "cloud" to represent different communications topologies such as a backbone topology, a hub-and-spoke topology, a loop topology, an irregular topology, and so on, or any suitable combination thereof. As such, the communications medium 103 can include copper-based data communications devices and cabling, fiber optic devices and cabling, wireless devices, and so on, or any suitable combination thereof. The communications medium 103 can be further configured to support storage area network (SAN)-based communications, network attached storage (NAS)-based communications, local area network (LAN)-based communications, metropolitan area network (MAN)-based communications, wide area network (WAN)-based communications, wireless communications, distributed infrastructure communications, and/or any other suitable communications.

The storage node 104 can be connected directly to the storage array 106 or by way of an optional network infrastructure 110, which can include an Ethernet network, an InfiniBand network, a fiber channel network, and/or any other suitable network(s). As shown in FIG. 1, the storage node 104 can include a communications interface 112, processing circuitry 114, and a memory 116. The communications interface 112 can include one or more of an Ethernet interface, an InfiniBand interface, a fiber channel interface, and/or any other suitable communications interface. The communications interface 112 can further include SCSI target adapters, network interface adapters, and/or any other suitable adapters for converting electronic, optical, and/or wireless signals received over the network 108 to a form suitable for use by the processing circuitry 114.

The memory 116 can include volatile memory such as a random-access memory (RAM) cache 122 or any other suitable volatile memory, as well as persistent memory such as a nonvolatile random-access memory (NVRAM) 124 or any other suitable persistent memory. The memory 116 can also store a variety of software constructs realized in the form of specialized code and data 128 (e.g., program instructions) that can be executed by the processing circuitry 114 to carry out the techniques and/or methods disclosed herein. The memory 116 can further include an operating system 126, such as a Linux operating system (OS), Unix OS, Windows OS, or any other suitable operating system.

The processing circuitry 114 can include one or more physical storage processors and/or engines configured to execute the specialized code and data 128, as well as data movers, director boards, blades, IO modules, storage drive controllers, switches, and/or any other suitable computer hardware or combination thereof. For example, the processing circuitry 114 can execute the specialized code and data 128 as program instructions out of the memory 116, process storage IO requests (e.g., write IO requests, read IO requests) issued by the respective host computers 102.1, ..., 102.n, and/or store data and/or metadata to the storage array 106 in the storage cluster environment 100, which can be a clustered RAID environment.

As shown in FIG. 1, the storage array 106 can include a coded target 120, which can be configured to store coded data for use in regenerating lost or corrupted data on one or more of the storage targets 118.1, 118.2, ..., 118.m. In some embodiments, the coded target 120 can be stored to a hard disk drive (HDD) configured to store parity data in a RAID array. Alternatively, or in addition, the storage targets 118.1, 118.2, ..., 118.m and the coded target 120 can be stored to one or more HDDs, solid state drives (SSDs), flash devices, and/or any other suitable storage device(s). It is noted that the storage node 104 can include a keyboard, a mouse, and/or any other suitable IO device(s), an uninterruptable power supply (UPS), and/or any other suitable storage node component(s).

In the context of the processing circuitry 114 being implemented using one or more processors executing the specialized code and data 128, a computer program product can be configured to deliver all or a portion of the specialized code and data 128 to the respective processor(s). Such a computer program product can include one or more non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

Figure 2:
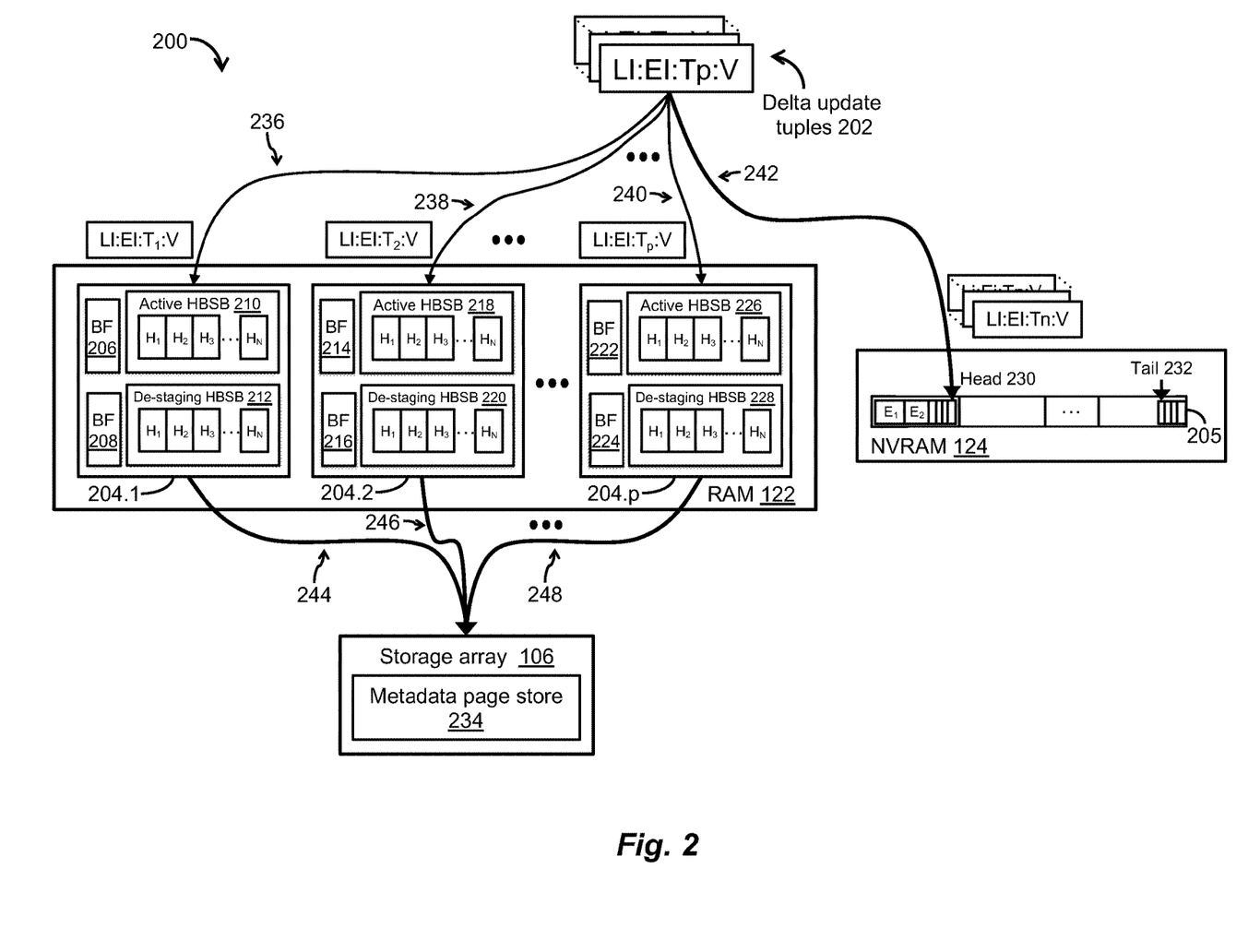
FIG. 2 is a block diagram of a delta log-based architecture of a storage node in the storage cluster environment of FIG. 1.

FIG. 2 depicts a delta log-based architecture 200 of the storage node 104 in the storage cluster environment 100 of FIG. 1. As shown in FIG. 2, the delta log-based architecture 200 can include volatile memory components having multiple instances of metadata delta logs 204.1, 204.2, ..., 204.p (also referred to herein collectively as the "metadata delta log 204"), which can be implemented in the RAM cache 122. The metadata delta log 204.1 can include a first (active) set 210 of data buckets (also referred to herein as data "containers") $H_1, H_2, H_3, \ldots, H_N$ (in which "N" is any suitable positive integer) and an associated bloom filter (BF) 206, as well as a second (de-staging) set 212 of data buckets (containers) $H_1, H_2, H_3, \ldots, H_N$ and an associated bloom filter (BF) 208. Likewise, the metadata delta log 204.2 can include a first (active) set 218 of data buckets (containers) $H_1, H_2, H_3, \ldots, H_N$ and an associated bloom filter (BF) 214, as well as a second (de-staging) set 220 of data buckets (containers) $H_1, H_2, H_3, \ldots, H_N$ and an associated bloom filter (BF) 216. In general, the metadata delta log 204.p (in which "p" is any suitable positive integer) can include a first (active) set 226 of data buckets (containers) $H_1, H_2, H_3, \ldots, H_N$ and an associated bloom filter (BF) 222, as well as a second (de-staging) set 228 of data buckets (containers) $H_1, H_2, H_3, \ldots, H_N$ and an associated bloom filter (BF) 224. Each of the first and second sets of data containers $H_1, H_2, H_3, \ldots, H_N$ included in the metadata delta log 204 can be configured to store delta updates of metadata pages. For example, each of the data containers $H_1, H_2, H_3, \ldots, H_N$ can be configured as a binary tree (b-tree) structure with multiple levels of nodes (Top, Mid, Leaf) or any other suitable data structure.

As described herein, the processing circuitry 114 of the storage node 104 can execute the specialized code and data 128 as program instructions out of the memory 116, and process storage IO requests (e.g., write IO requests, read IO requests) issued by the respective host computers 102.1, ..., 102.n to write/read data and/or metadata to/from the storage array 106. For example, each portion of metadata (e.g., each delta update) can be de-staged from the metadata delta log 204 and stored to a metadata page on the storage array 106. Further, each delta update can specify a change to a data value at the leaf level of a b-tree structure maintained by a respective one of the data containers $H_1, H_2, H_3, \ldots H_N$.

In some embodiments, the storage node 104 can convert a plurality of delta updates of a metadata page into a plurality of delta update tuples 202, respectively. As shown in FIG. 2, each of the plurality of delta update tuples 202 can include several tuple parameters such as a logical index "LI" of a metadata page, an entry index "EI" that refers to an offset within the metadata page, a delta type "$T_p$" that defines the type "p" of the delta update entry, and a value "V" of the delta update entry. The storage node 104 can also write delta update tuples for particular delta types $T_1, T_2, \ldots, T_p$ to the metadata delta logs 204.1, ..., 204.p, respectively, in the volatile memory (i.e., the RAM cache 122). For example, the storage node 104 can write delta update tuples LI:EI:$T_1$:V to the metadata delta log 204.1 (as illustrated by a path 236), as well as write delta update tuples LI:EI:$T_2$:V to the metadata delta log 204.2 (as illustrated by a path 238). In general, the storage node 104 can write delta update tuples LI:EI:$T_1$:V to the metadata delta log 204.p (as illustrated by a path 240), in which "p" is any suitable positive integer. The storage node 104 can subsequently de-stage the delta updates of the metadata page from the metadata delta log 204 to a metadata page store 234 (as illustrated by paths 244, 246, 248) included in the storage array 106. In some embodiments, a "drop-delta" flag can be entered into the metadata delta log 204 (and a journal 205) to indicate that the delta updates of the metadata page that occur before the drop-delta flag can be found in the storage array 106 and can therefore be discarded.

In some embodiments, the storage node 104 can determine the target data containers $H_1, H_2, H_3, \ldots,$ or $H_N$ for the respective delta update tuples LI:EI:$T_1$:V in the first set 210 of data containers of the metadata delta log 204.1 based on a predetermined hash function of the logical index, LI, of the metadata page. Likewise, the storage node 104 can determine the target data containers $H_1, H_2, H_3, \ldots,$ or $H_N$ for the respective delta update tuples LI:EI:$T_2$:V in the first set 218 of data containers of the metadata delta log 204.2 based on a predetermined hash function of the logical index, LI, of the corresponding metadata page. In general, the storage node 104 can determine the target data containers $H_1, H_2, H_3, \ldots$, or $H_N$ for the respective delta update tuples $LI:EI:T_1:V$ in the first set 226 of data containers of the metadata delta log 204.$p$ (in which "p" is any suitable positive integer) based on a predetermined hash function of the logical index, LI, of the metadata page. In such embodiments, the various data containers $H_1, \ldots, H_N$ of the metadata delta log 204 can be referred to as hash-based sorted buckets (HBSBs).

As shown in FIG. 2, the storage node 104 can write copies of the delta update tuples $LI:EI:T_1:V$ (also referred to herein as "raw delta updates") for the particular delta types $T_1, T_2, \ldots, T_p$ to the journal 205 (as illustrated by a path 242) included in the persistent memory (i.e., the NVRAM 124). In the event of a disaster, data loss, and/or data corruption, the storage node 104 can replay the journal 205 to apply the raw delta updates written thereto to the metadata delta log 204, thereby recovering the metadata delta log 204 to a consistent state. In some embodiments, the journal 205 can be configured as a ring buffer having a head 230 and a tail 232. Further, the storage node 104 can write each respective tuple $LI:EI:T_p:V$ for a particular delta type $T_1, T_2, \ldots,$ or $T_p$ to the head 230 of the ring buffer, and subsequently release allocated space for the respective tuple $LI:EI:T_p:V$ from the tail 232 of the ring buffer. As such, the journal 205 can store the respective tuples $Li:Ei:T_p:V$ in time order (e.g., from oldest to newest).

During operation, a snapshot or "snap" of a metadata page can be created by writing specialized delta update entries to the metadata delta log 204. In some embodiments, such specialized delta update entries can have formats expressed as:

"LI2:IS_CHILD_OF:LI1" and  (1)

"LI1:IS_PARENT_OF:LI2,"  (2)

in which "LI1" and "LI2" correspond to logical indexes of a parent metadata page and a child metadata page, respectively, resulting from the snapshot creation, or any other suitable format. For example, a parent-child dependency relationship can be created between the snap and the metadata page. Once the specialized delta update entries (see (1) and (2) above) are atomically and transactionally written to the metadata delta log 204, the logical indexes LI1 and LI2 of the parent and child metadata pages, respectively, are allocated. However, the parent and/or child metadata pages are actually built at later times when the delta updates of the respective metadata pages are de-staged from the metadata delta log 204 and stored to the storage array 106. Such a snapshot created by this process is referred to herein as a "lazy snapshot."

During such operation, one or more new delta updates of the parent metadata page can be written to the metadata delta log 204 as one or more specialized delta update entries having a format expressed as:

"LI1:EI1:NON-INHERITED:OLD_VALUE-NEW_VALUE,"  (3)

in which "LI1" corresponds to the logical index of the parent metadata page, "EI1" corresponds to an offset within the parent metadata page, "NEW_VALUE" corresponds to the value of a new delta update of the parent metadata page, and "OLD_VALUE" corresponds to the value of an original (old) delta update of the parent metadata page, or any other suitable format. It is noted that the format of these specialized delta update entries (see (3) above) includes the designation, "NON-INHERITED," to expressly indicate that such delta update entries are not inheritable by the child metadata page, LI2, from the parent metadata page, LI1. By creating a dependency relationship between the parent metadata page, LI1, and the child metadata page, LI2, receiving one or more new delta updates of the parent metadata page, LI1, and writing, to the metadata delta log 204, the new delta updates of the parent metadata page, LI1, as specialized delta update entries that preserve or maintain both the new delta update values and their corresponding original (old) delta update values, constraints pertaining to the order of de-staging the delta updates of the parent and child metadata pages, LI1 and LI2, can be reduced The disclosed techniques for providing dependency resolution for lazy snapshots in a storage cluster with a delta log-based architecture will be further understood with reference to the following illustrative example and FIGS. 3$a$-3$d$. In this example, it is assumed that a snapshot or Snap 304 of a metadata (MD) page 302 is created, ultimately resulting in a parent-child dependency relationship being created between the Snap 304 and the MD page 302.

FIG. 3$a$ depicts a mapping layer configuration 300$a$ of the MD page 302 before the creation of the Snap 304. As described herein with reference to the delta log-based architecture 200 (see FIG. 2), each of the data containers $H_1, H_2, H_3, \ldots, H_N$ of the metadata delta log 204 can be configured as a b-tree structure. Such a b-tree structure can have multiple levels of nodes, including a top level ("Top"), at least one middle level ("Mid"), and a leaf level ("Leaf"). As shown in FIG. 3$a$, the mapping layer configuration 300$a$ of the MD page 302 includes a top level, $Top_1$, a mid-level, $Mid_1$, and a leaf level, $Leaf_1$, each of which can include a set of block pointers implemented by a pointer array that points to a successive level of the b-tree structure. It is noted that the top level, $Top_1$, is uniquely associated with the MD page 302.

FIG. 3$b$ depicts mapping layer configurations 300$b$ of the MD page 302 and the Snap 304 of the MD page 302. As shown in FIG. 3$b$, the mapping layer configuration of the MD page 302 is now depicted with reference to a top level, $Top_2$, the mid-level, $Mid_1$, and the leaf level, $Leaf_1$. As further shown in FIG. 3$b$, the mapping layer configuration of the Snap 304 includes a top level, $Top_3$, the mid-level, $Mid_1$, and the leaf level, $Leaf_1$. It is noted that each of the top levels, $Top_2$ and $Top_3$, corresponds to a copy of the top level, $Top_1$ (as indicated by dashed arrows 306, 308). It is further noted that the top level, $Top_2$, is now uniquely associated with the MD page 302, and the top level, $Top_3$, is uniquely associated with the Snap 304.

Figure 3A:
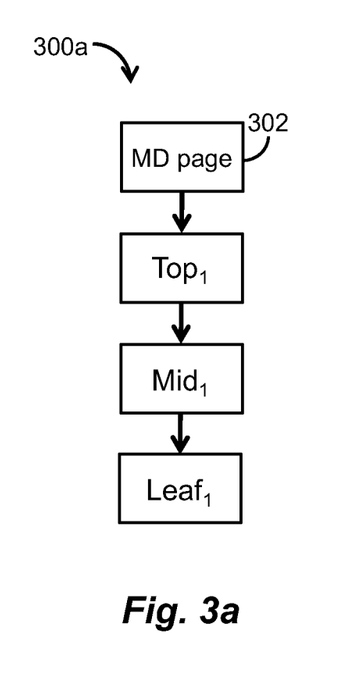
FIGS. 3a-3c are block diagrams of mapping layer configurations for a metadata page, a snapshot of the metadata page, and a delta update of the snapshot, in which a parent-child dependency relationship exists between the snapshot and the metadata page.
Figure 3B:
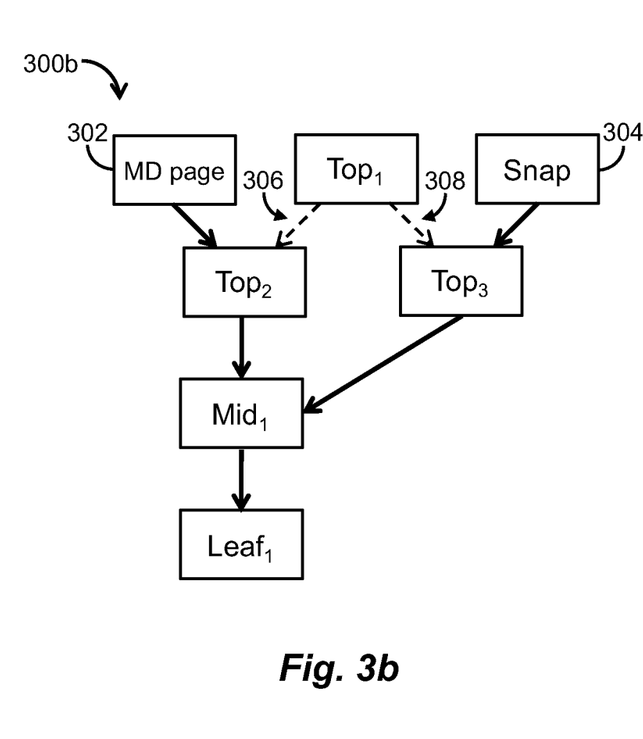
Figure 3C:
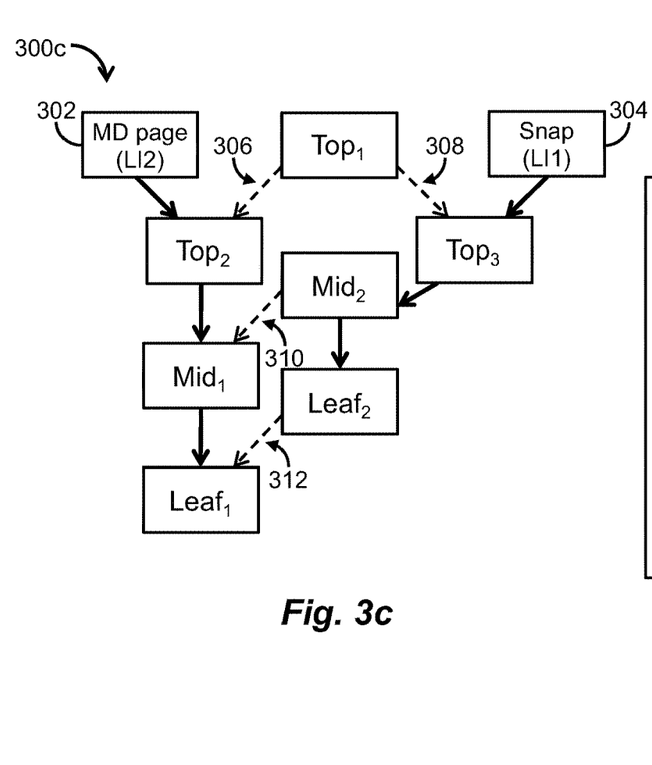

In this example, both the MD page 302 and the Snap 304 are implemented as "writable" metadata pages. In other words, one or more new delta updates can be received not only for the MD page 302, but also for the Snap 304. FIG. 3$c$ depicts mapping layer configurations 300$c$ of the MD page 302 and the Snap 304 following the receipt of a new delta update for the Snap 304. As shown in FIG. 3$c$, the mapping layer configuration of the MD page 302 is again depicted with reference to the top level, $Top_2$, the mid-level, $Mid_1$, and the leaf level, $Leaf_1$. However, the mapping layer configuration of the Snap 304 is now depicted with reference to the top level, $Top_3$, a mid-level, $Mid_2$, and a leaf level, $Leaf_2$. It is noted that the actual metadata of the new delta update is maintained at the leaf level, $Leaf_2$, of the Snap 304, while the actual metadata of the original (old) delta update is maintained at the leaf level, $Leaf_1$, of the MD page 302.

Once the new delta update is received for the Snap 304, a parent-child dependency relationship is created between the Snap 304 and the MD page 302. In this example, the Snap 304 (i.e., the parent metadata page) has a logical index, LI1, and the MD page 302 (i.e., the child metadata page) has a logical index, LI2. As shown in FIG. 3c, the parent-child dependency relationship between the Snap (LI1) 304 and the MD page (LI2) 302 includes a parent-child dependency relationship between the mid-level, $Mid_2$, of the Snap (LI1) 304 and the mid-level, $Mid_1$, of the MD page (LI2) 302 (as indicated by a dashed arrow 310), as well as a parent-child dependency relationship between the leaf level, $Leaf_2$, of the Snap (LI1) 304 and the leaf level, $Leaf_1$, of the MD page (LI2) 302 (as indicated by a dashed arrow 312).

Figure 3D:
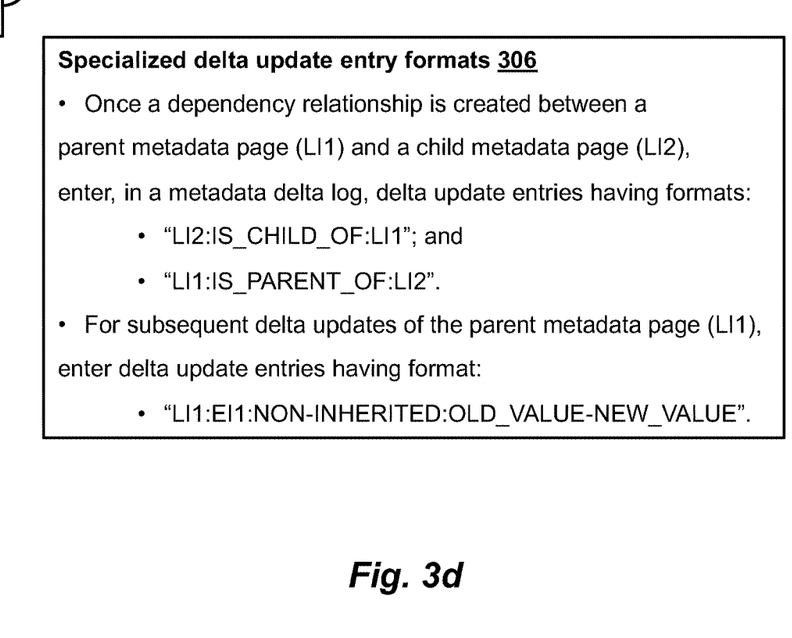
FIG. 3d depicts formats of specialized delta update entries that can be written to a metadata delta log in a storage node with a delta log-based architecture.

FIG. 3d depicts several specialized delta update entry formats 306 that can be employed once the parent-child relationship is created between the Snap 304 and the MD page 302. As described herein, the creation of a lazy snapshot (e.g., the Snap 304) of a metadata page (e.g., the MD page 302) can include atomically and transactionally writing, to the metadata delta log 204, first and second specialized delta update entries having formats expressed as:

"LI2:IS_CHILD_OF:LI1" and

"LI1:IS_PARENT_OF:LI2."

In this example, the first specialized delta update entry, LI2:IS_CHILD_OF:LI1, indicates that the MD page (LI2) 302 is a child of the Snap (LI1) 304, and the second specialized delta update entry, LI1:IS_PARENT_OF:LI2, indicates that the Snap (LI1) 304 is the parent of the MD page (LI2) 302.

As further described herein, a new delta update of the parent metadata page (e.g., the Snap 304) can be written to the metadata delta log 204 as a specialized delta update entry having a format expressed as:

"LI1:EI1:NON-INHERITED:OLD_VALUE-NEW_VALUE,"

in which "NEW_VALUE" corresponds to the value of the new delta update of the parent metadata page, and "OLD_VALUE" corresponds to the value of the original (old) delta update of the parent metadata page. Once the new delta update of the parent metadata page has been written to the metadata delta log 204 using this specialized delta update entry format, both the new delta update value and its corresponding old delta update value are effectively preserved or maintained at the leaf level, $Leaf_2$, of the Snap 304. It is noted that new delta updates of the child metadata page (e.g., the MD page 302) can be maintained at the leaf level, $Leaf_1$, of the MD page 302.

In this example, at a time when the delta updates of the parent metadata page (i.e., the Snap 304) are to be de-staged and stored to the storage array 106, steps for building the parent metadata page can include (i) locating the specialized delta update entry, LI1:IS_PARENT_OF:LI2, in the metadata delta log 204, (ii) applying the delta updates of the parent metadata page that occur in the metadata delta log 204 before and up to the LI1:IS_PARENT_OF:LI2 entry, and (iii) applying the new delta update values of the parent metadata page that occur in the metadata delta log 204 after the LI1:IS_PARENT_OF:LI2 entry, as found in the entries with the format, LI1:EI1:NON-INHERITED:OLD_VALUE-NEW_VALUE. The parent metadata page (i.e., the Snap 304) can then be stored to the storage array 106.

Further in this example, at a time when the delta updates of the child metadata page (i.e., the MD page 302) are to be de-staged and stored to the storage array 106, a determination is made as to whether or not the parent metadata page (i.e., the Snap 304) has already been de-staged. If the parent metadata page has not yet been de-staged, then steps for building or otherwise obtaining a base page for the child metadata page can include (i) locating the specialized delta update entry, LI2:IS_CHILD_OF:LI1, in the metadata delta log 204, (ii) obtaining the logical index, LI1, of the parent metadata page from the LI2:IS_CHILD_OF:LI1 entry, and (iii) applying, to the base page, the delta updates of the parent metadata page that occur in the metadata delta log 204 before and up to the LI1:IS_PARENT_OF:LI2 entry. Having obtained the base page for the child metadata page, steps for building the child metadata page can include applying, to the base page, any new delta update values of the child metadata page that occur in the metadata delta log 204 after the LI2:IS_CHILD_OF:LI1 entry. The child metadata page (i.e., the MD page 302) can then be stored to the storage array 106.

Otherwise, if the parent metadata page (i.e., the Snap 304) has already been de-staged (as indicated by a drop-delta flag in the metadata delta log 204), then steps for building or otherwise obtaining a base page for the child metadata page (i.e., the MD page 302) can include (i) locating the specialized delta update entry, LI2:IS_CHILD_OF:LI1, in the metadata delta log 204, (ii) obtaining the logical index, LI1, of the parent metadata page from the LI2:IS_CHILD_OF:LI1 entry, (iii) loading a copy of the parent metadata page from the metadata page store 234 of the storage array 106, and (iv) applying the old delta update values of the parent metadata page that occur in the metadata delta log 204 after the LI1:IS_PARENT_OF:LI2 entry, as found in the entries with the format, LI1:EI1:NON-INHERITED:OLD_VALUE-NEW_VALUE. Having obtained the base page for the child metadata page, steps for building the child metadata page can include applying, to the base page, any new delta update values of the child metadata page that occur in the metadata delta log 204 after the LI2:IS_CHILD_OF:LI1 entry. The child metadata page (i.e., the MD page 302) can then be stored to the storage array 106.

Figure 4:
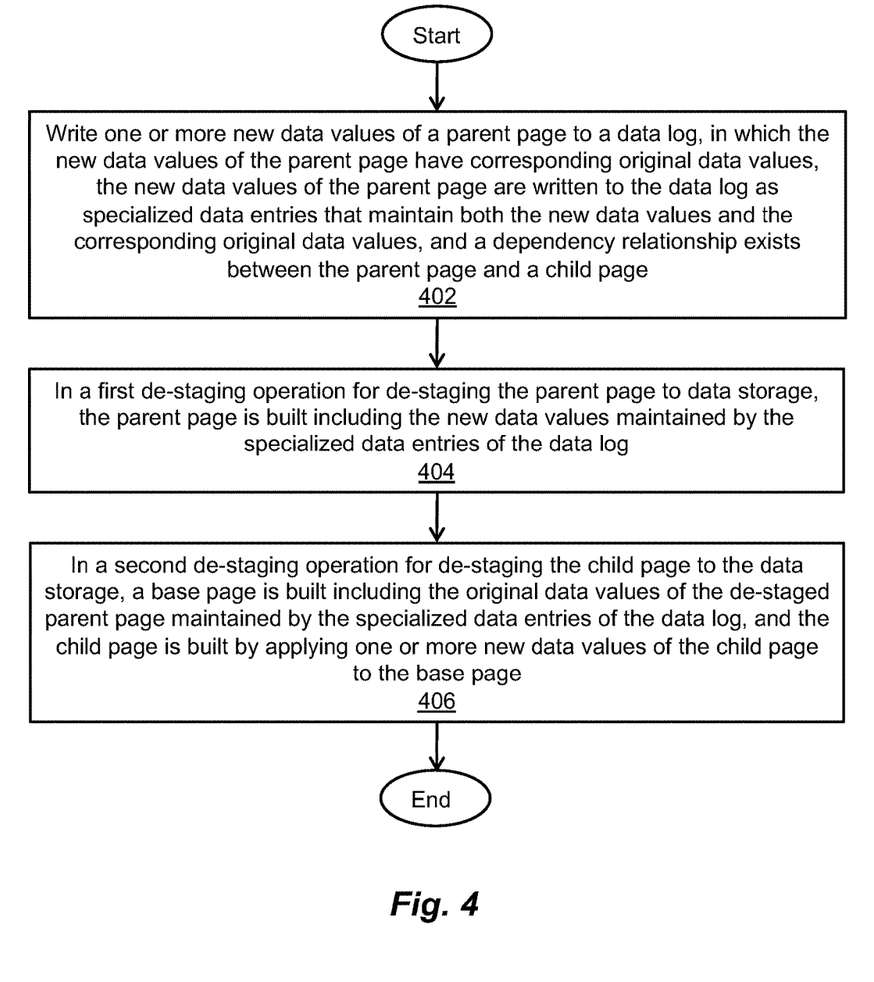
FIG. 4 is a flow diagram of a method of providing dependency resolution for lazy snapshots in a storage cluster with a delta log-based architecture.

A method of providing dependency resolution for lazy snapshots in a storage cluster with a delta log-based architecture is described below with reference to FIG. 4. As depicted in block 402, one or more new data values of a parent page are written to a data log, in which the new data values of the parent page have corresponding original data values, the new data values of the parent page are written to the data log as specialized data entries that maintain both the new data values and the corresponding original data values, and a dependency relationship exists between the parent page and a child page. As depicted in block 404, in a first de-staging operation for de-staging the parent page to data storage, the parent page is built including the new data values maintained by the specialized data entries of the data log. As depicted in block 406, in a second de-staging operation for de-staging the child page to the data storage, a base page is built including the original data values of the de-staged parent page maintained by the specialized data entries of the data log, and the child page is built by applying one or more new data values of the child page to the base page.

Having described the above illustrative embodiments of the disclosed systems and methods, other alternative embodiments and/or variations may be made and/or practiced. For example, it was described herein that the disclosed techniques can be employed in de-staging operations for de-staging parent and/or child metadata pages from a metadata delta log to a storage array. In certain alternative embodiments, the disclosed techniques can be further employed to build or reconstruct a metadata page in response to a read cache miss.

It was further described herein that new delta updates of a parent metadata page can be written to a metadata delta log as specialized delta update entries having a format that preserves or maintains both the new delta update values and their corresponding original (old) delta update values. In certain alternative embodiments, if the original (old) delta update values are unknown at the time the specialized delta update entries are written to the metadata delta log (e.g., the parent metadata page may not be cached), the new delta updates of the parent metadata page can be written to the metadata delta log as specialized delta update entries having a format expressed as:

"LI1:EI1:NON-INHERITED:INVALID_VALUE-NEW_VALUE," (4)

in which "INVALID_VALUE" corresponds to a placeholder for the unknown old delta update values. At a time when the delta updates of the parent metadata page are to be de-staged from the metadata delta log, the parent metadata page (if not cached) can be loaded from a metadata page store, and the specialized delta update entries (see (4) above) in the metadata delta log can be modified to replace each placeholder, INVALID_VALUE, with a corresponding original (old) delta update value from the loaded metadata page. The modified specialized delta update entries with the original (old) delta update values can then be employed in de-staging operations for the parent metadata page and/or its child metadata page(s), as described herein.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing dependency resolution for a parent page and a child page in a storage cluster with a delta log-based architecture, comprising:

writing one or more new data values of a parent page to a data log, the new data values of the parent page having corresponding original data values, the new data values of the parent page being written to the data log as respective specialized data entries that maintain both the new data values and the corresponding original data values, and a dependency relationship existing between the parent page and a child page;

in a first de-staging operation for de-staging the parent page to data storage, building the parent page including the new data values maintained by the respective specialized data entries of the data log;

in a second de-staging operation for de-staging the child page to the data storage, building a base page including the original data values of the de-staged parent page maintained by the respective specialized data entries of the data log, and building the child page by applying one or more new data values of the child page to the base page; and at a time of creation of the dependency relationship between the parent page and the child page, writing, to the data log, a first specialized data entry from among the respective specialized data entries that indicates the child page as being a child of the parent page.

2. The method of claim 1 further comprising:

writing one or more new data values of the child page to the data log after the first specialized data entry.

3. The method of claim 1 further comprising:
at the time of creation of the dependency relationship between the parent page and the child page, writing, to the data log, a second specialized data entry from among the respective specialized data entries that indicates the parent page as being a parent of the child page, the one or more new data values of the parent page being written to the data log after the second specialized data entry.

4. The method of claim 3 wherein the first de-staging operation includes locating the second specialized data entry in the data log, and applying, to the parent page, data values of the parent page that occur in the data log before and up to the second specialized data entry.

5. The method of claim 4 wherein the first de-staging operation further includes applying, to the parent page, the new data values of the parent page from the respective specialized data entries that occur in the data log after the second specialized data entry.

6. The method of claim 5 wherein the first de-staging operation further includes storing the parent page to data storage.

7. The method of claim 3 wherein the second de-staging operation includes determining whether or not the parent page has already been de-staged.

8. The method of claim 7 wherein the second de-staging operation further includes, having determined that the parent page has not yet been de-staged, obtaining a base page for the child page including locating the first specialized data entry in the data log, obtaining a logical index of the parent page from the first specialized data entry, and applying, to the base page, the data values of the parent page that occur in the data log before and up to the second specialized data entry.

9. The method of claim 8 wherein the second de-staging operation further includes, having obtained the base page, building the child page including applying, to the base page, one or more new data values of the child page written to the data log after the first specialized data entry.

10. The method of claim 7 wherein the second de-staging operation further includes, having determined that the parent page has already been de-staged, obtaining a base page for the child page including locating the first specialized data entry in the data log, obtaining a logical index of the parent page from the first specialized data entry, and loading a copy of the parent page from data storage.

11. The method of claim 10 wherein the second de-staging operation further includes applying, to the loaded copy of the parent page, the corresponding original data values of the parent page from the respective specialized data entries that occur in the data log after the second specialized data entry.

12. The method of claim 11 wherein the second de-staging operation further includes, having obtained the base page, building the child page including applying, to the base page, one or more new data values of the child page written to the data log after the first specialized data entry.

13. The method of claim 12 wherein the second de-staging operation further includes storing the child page to data storage.

14. The method of claim 1 wherein the writing of the one or more new data values of the parent page to the data log includes determining that the one or more corresponding original data values are unknown, and maintaining placeholder values for the one or more unknown original data values in the respective specialized data entries.

15. The method of claim 14 wherein the first de-staging operation includes loading a copy of the parent page from data storage, and replacing the placeholder values for the one or more unknown original data values in the respective specialized data entries with corresponding original data values from the loaded copy of the parent page.

16. A system for providing dependency resolution for a parent page and a child page in a storage cluster with a delta log-based architecture, the system comprising:
a memory; and
processing circuitry configured to execute program instructions out of the memory to:
write one or more new data values of a parent page to a data log,
wherein the new data values of the parent page have corresponding original data values,
wherein the new data values of the parent page are written to the data log as respective specialized data entries that maintain both the new data values and the corresponding original data values, and
wherein a dependency relationship exists between the parent page and a child page;
in a first de-staging operation for de-staging the parent page to data storage, build the parent page including the new data values maintained by the respective specialized data entries of the data log; and
in a second de-staging operation for de-staging the child page to the data storage, build a base page including the original data values of the de-staged parent page maintained by the respective specialized data entries of the data log, and build the child page by applying one or more new data values of the child page to the base page,
wherein the processing circuitry is further configured to execute the program instructions out of the memory to:
determine that the one or more corresponding original data values are unknown;
maintain placeholder values for the one or more unknown original data values in the respective specialized data entries;
load a copy of the parent page from data storage; and
replace the placeholder values for the one or more unknown original data values in the respective specialized data entries with corresponding original data values from the loaded copy of the parent page.

17. A non-transitory computer-readable storage medium encoded with program instructions that, when executed by processing circuitry, cause the processing circuitry to perform a method of providing dependency resolution for a parent page and a child page in a storage cluster with a delta log-based architecture, the method comprising:
writing one or more new data values of a parent page to a data log, the new data values of the parent page having corresponding original data values, the new data values of the parent page being written to the data log as respective specialized data entries that maintain both the new data values and the corresponding original data values, and a dependency relationship existing between the parent page and a child page;
in a first de-staging operation for de-staging the parent page to data storage, building the parent page including the new data values maintained by the respective specialized data entries of the data log; and
in a second de-staging operation for de-staging the child page to the data storage, building a base page including the original data values of the de-staged parent page maintained by the respective specialized data entries of the data log, and building the child page by applying one or more new data values of the child page to the base page, wherein the writing of the one or more new data values of the parent page to the data log includes determining that the one or more corresponding original data values are unknown, and maintaining placeholder values for the one or more unknown original data values in the respective specialized data entries; and wherein the first de-staging operation includes loading a copy of the parent page from data storage, and replacing the placeholder values for the one or more unknown original data values in the respective specialized data entries with corresponding original data values from the loaded copy of the parent page.

* * * * *